United States Patent
Relan (10) Patent No.: US 7,280,541 B2
(45) Date of Patent: Oct. 9, 2007

(54) PACKET FILTERING BASED ON CONDITIONAL EXPRESSION TABLE

(75) Inventor: Sandeep Relan, Bangalore (IN)

(73) Assignee: Broadcom Corporation, Irvine, CA (US)

(*) Notice: Subject to any disclaimer, the term of this patent is extended or adjusted under 35 U.S.C. 154(b) by 1053 days.

(21) Appl. No.: 10/179,264

(22) Filed: Jun. 26, 2002

(65) Prior Publication Data

US 2003/0174703 A1 Sep. 18, 2003

Related U.S. Application Data (60) Provisional application No. 60/364,053, filed on Mar. 15, 2002.

(51) Int. Cl.
 *H04L 12/56* (2006.01)
(52) U.S. Cl. .................. 370/392; 709/238
(58) Field of Classification Search ............... 370/392, 370/389, 400, 401; 707/3, 4, 5
See application file for complete search history.

(56) References Cited

U.S. PATENT DOCUMENTS

| | | |
|---|---|---|
| 5,473,607 A | 12/1995 | Hausman et al. |
| 5,761,424 A | 6/1998 | Adams et al. |
| 5,951,651 A | 9/1999 | Lakshman et al. |
| 6,016,310 A | 1/2000 | Muller et al. |
| 6,088,356 A | 7/2000 | Hendel et al. |
| 6,173,384 B1 | 1/2001 | Weaver |
| 6,259,699 B1 | 7/2001 | Opalka et al. |
| 6,289,013 B1 | 9/2001 | Lakshman et al. |
| 6,570,884 B1* | 5/2003 | Connery et al. ............ 370/419 |
| 6,658,002 B1* | 12/2003 | Ross et al. ................. 370/392 |
| 6,718,326 B2* | 4/2004 | Uga et al. ..................... 707/6 |
| 6,778,984 B1* | 8/2004 | Lu et al. ....................... 707/4 |
| 6,850,521 B1* | 2/2005 | Kadambi et al. ........... 370/389 |
| 6,876,653 B2* | 4/2005 | Ambe et al. ................ 370/389 |
| 2002/0054604 A1* | 5/2002 | Kadambi et al. ........... 370/419 |
| 2002/0196796 A1* | 12/2002 | Ambe et al. ................ 370/401 |
| 2003/0156586 A1* | 8/2003 | Lee et al. ................... 370/392 |
| 2003/0174711 A1* | 9/2003 | Shankar ................ 370/395.53 |
| 2005/0152369 A1* | 7/2005 | Ambe et al. ................ 370/392 |

FOREIGN PATENT DOCUMENTS

| | | |
|---|---|---|
| EP | 1 085 720 A2 | 3/2001 |
| WO | WO 00/56024 | 9/2000 |
| WO | WO 01/37115 A2 | 5/2001 |

OTHER PUBLICATIONS

"A Comparison of Hashing Schemes for Address Lookup in Computer Networks", Jain, IEEE Transactions on Communications, vol. 40, No. 10, Oct. 1, 1992, pp. 1570-1573, XP000331089.

* cited by examiner

*Primary Examiner*—Min Jung
(74) *Attorney, Agent, or Firm*—Squire, Sanders & Dempsey L.L.P.

(57) ABSTRACT

A filter for processing a packet can have a plurality of first masks for masking the packet, and a storage unit configured to correspond to the plurality of first masks for storing a first bit map. In addition, the filter can have a first table configured to apply the first bit map thereto. If upon applying the first bit map to the first table results in a match, then at least one specified action is implemented on the packet.

67 Claims, 9 Drawing Sheets

RULES TABLE 70

| ACTIONS = Do . . . |
|---|
| ACTIONS = Do . . . |
| ACTIONS = Do . . . |
| • • • |
| ACTIONS = Do . . . |

Fig.5

CONDITIONAL EXPRESSION TABLE 80

| | |
|---|---|
| 1100 ... 000 | 010 ... 101 |
| 0111 ... 000 | 100 ... 001 |
| 0000 ... 001 | 010 ... 100 |
| ⋮ | ⋮ |
| 1000 ... 010 | 000 ... 101 |

CONDITIONAL EXPRESSION ENTRIES 83

ACTION BIT MAPS 85

Fig.6

CONDITIONAL EXPRESSION TABLE 90

| 1100 ... 000 | POINTER 0 |
|---|---|
| 0111 ... 000 | POINTER 1 |
| 0000 ... 001 | POINTER 2 |
| ⋮ | ⋮ |
| 1000 ... 010 | POINTER X |

CONDITIONAL EXPRESSION ENTRIES 93

POINTERS 95

PACKET FILTERING BASED ON CONDITIONAL EXPRESSION TABLE

CROSS-REFERENCE TO RELATED APPLICATIONS

This application claims priority of U.S. Provisional Patent Application Ser. No. 60/364,053, filed Mar. 15, 2002. The contents of the provisional application is hereby incorporated by reference.

BACKGROUND OF THE INVENTION

1. Field of the Invention

The present invention relates to a method and an apparatus for high performance packet filtering in a communication network environment such as token ring, ATM, Ethernet, Fast Ethernet, and Gigabit Ethernet environment. Moreover, the present invention can be applied to any packet based media environment. In particular, the present invention relates to a packet filter and a method for filtering a packet that can be implemented on a semiconductor substrate such as a silicon chip.

2. Description of the Related Art

In networking applications, an incoming packet enters an ingress port of a network component, such as a switch, wherein the network component processes the incoming packet and directs it to an egress port. In processing the incoming packet, the network component can examine the incoming packet on the ingress side of the network component, and can determine addressing and routing information to enhance network performance.

The network component can apply addressing and processing logic to the incoming packet.

SUMMARY OF THE INVENTION

One example of the present invention can provide a method of processing a packet. The method can include the steps of applying the packet through a plurality of first masks, and generating a first bit map which corresponds to the plurality of first masks. In addition, the method can include the steps of applying the first bit map to a first table, and implementing at least one action on the packet.

In another example, the present invention can relate to a filter for processing a packet. The filter can include a plurality of first masks for masking the packet, and a storage unit configured to correspond to the plurality of first masks for storing a first bit map. In addition, the filter can include a first table configured to apply the first bit map thereto.

Furthermore, another example of the present invention can provide a system for filtering a packet. The system can have a plurality of first masking means for masking the packet, and a generating means for generating a first bit map to correspond to the plurality of first masking means. The system can also include a means for applying the first bit map to a first table, and an implementing means for implementing at least one action stored in the first table.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
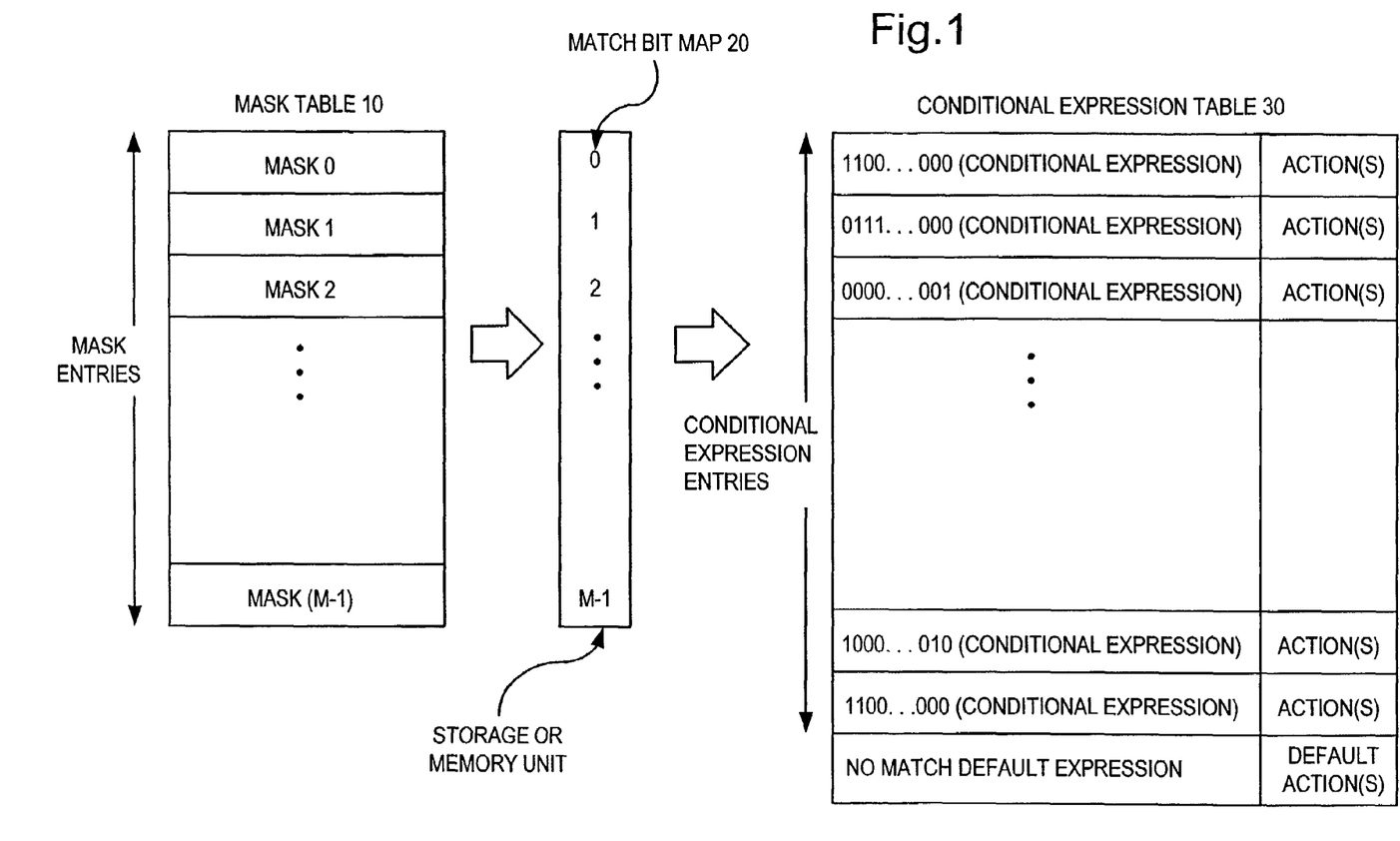
FIG. 1 illustrates one example of a configuration for filtering a packet according to the present invention.

FIG. 1 illustrates one example of a hardware configuration that can perform packet filtering, in accordance with the present invention. The performance of packet filtering can also be referred to as packet classification. Therefore, the hardware configurations and examples provided herein can also perform packet classification.

As shown in FIG. 1, the configuration can contain a mask table 10, a storage or memory unit configured to store a match bit map 20, and a conditional expression table 30. The mask table 10, the storage or memory unit and the conditional expression table of FIG. 1 can be embodied, for example on a semiconductor substrate, such as silicon.

The mask table 10 can have a plurality of mask entries. Each mask entry can represent a filter mask for masking an incoming packet based on at least one programmable condition. Therefore, each mask entry can be pre-programmed with one or a plurality of filtering conditions, including but not limited to an exact match or partial-bit match conditions. Accordingly, the mask table 10 can mask an incoming packet based on pre-programmed conditions through each and every mask entry therein.

The match bit map 20 can be a bit map having a bit length equal to the number of mask entries in the mask table 10. In the alternative, the match bit map 20 can be a bit map having a bit length that is less than the number of mask entries in the mask table 10, which can be accomplished by compression techniques. For instance, the match bit map 20 can be compressed to a bit length that is less than number of mask entries by implementing an operation, such as an AND, OR, or XOR operation of the multiple mask entries to achieve a single bit length bit map. For example, a sixteen mask entry mask table can have a final match bit map of 8 bits in length by implementing an AND operation of two adjacent mask entries' match bit maps.

Each bit position of the match bit map 20 can be one bit in length and can correspond to a particular mask entry in the mask table 10. Additionally, each bit position of the match bit map 20 can be set as a conditional flag. In one example, each bit position can be set with a conditional flag of either 1 or 0. Additionally, each bit position can be set with a conditional flag 1 when there is a match of the masked packet in the corresponding mask entry. In contrast, each bit position can be set with a conditional flag 0 when there is a no-match of the masked packet in the corresponding mask entry. Therefore, the match bit map 20 can result in a bit map having a bit 1 or 0 in each bit position of the match bit map 20, wherein the setting of the conditional flag can be contingent on whether there is a match or no-match in the corresponding mask entry, respectively. As a result, the match bit map 20 can have a bit length of 1's and/or 0's equal to the number of the mask entries in the mask table 10. This match bit map 20 can be a vector that can thereafter be applied and indexed into the conditional expression table 30. In addition, the match bit map 20 can be of any binary encoding scheme, such as BCD or Grey encoding scheme.

The conditional expression table 30 as shown in FIG. 1 can be configured to include a plurality of conditional expression entries, which can be pre-programmed therein. The number of the conditional expression entries can have no dependent relationship with the number of mask entries in the mask table 10. In one example, each conditional expression entry can contain a pre-programmed conditional expression having bit 0's and/or 1's therein. In another example, each conditional expression entry can contain a pre-programmed value. The bit length of each conditional expression entry can equal to the bit length of the match bit map 20.

Additionally, the conditional expression table 30 can be configured to include a plurality of actions to be taken or implemented on the incoming packet. Each action can similarly be pre-programmed in the conditional expression table 30, and can be in the form of an op-code or operational instructions. In one example of the present invention, one or more actions can be associated with or correspond to a respective conditional expression entry. In other words, each one of the conditional expression entries can be associated with or correspond to one or more pre-programmed actions in the conditional expression table 30. Thus, each action field in the conditional expression table 30 can contain one or a plurality of actions therein.

Furthermore, the conditional expression table 30 can be configured to include at least one no-match default expression entry, which can also be pre-programmed into the conditional expression table 30. The no-match default expression entry can, for example, either be a default expression comprising of all bit 0's, a pre-programmed value or can be any means in identifying a no-match default expression. As mentioned above, the conditional expression table 30 can include a plurality of pre-programmed actions to be taken or implemented on the incoming packet. Accordingly, the no-match default expression entry can be associated with or correspond to one or more pre-programmed default actions in the conditional expression table 30.

It is noted that the conditional expression table 30 can also be configured without having any no-match default expression entries. In an example where the conditional expression table 30 does not contain any no-match default expression entries, the present invention can provide one or more fixed pre-programmable default no-match action(s) within the filtering logic of the filter device to implement on a packet. In the alternative, the present invention can provide no default no-match action if there is a no-match condition within the filter device.

Figure 2:
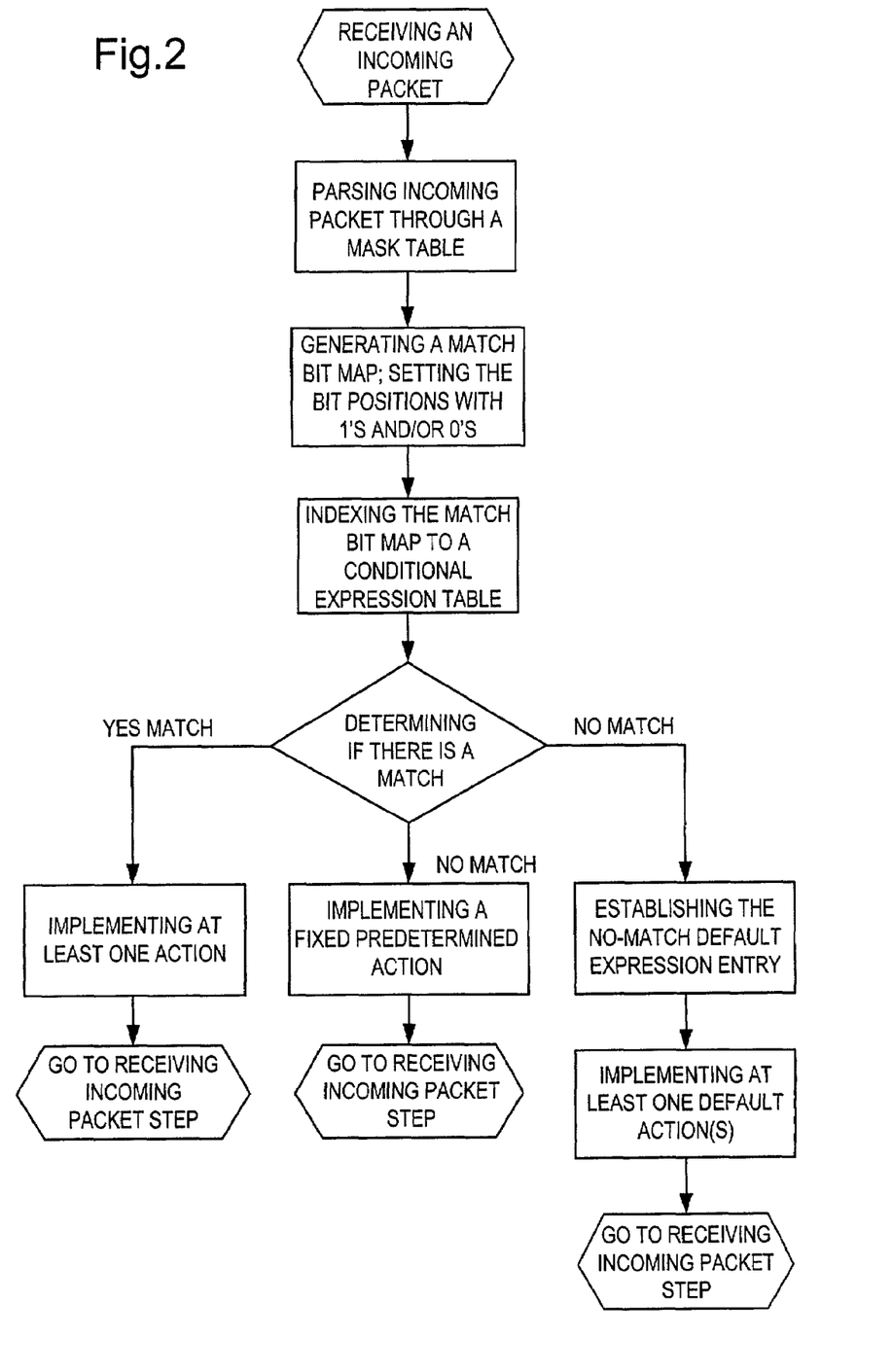
FIG. 2 illustrates a flow chart illustrating one example of a method of filtering a packet according to the present invention.

FIG. 2 illustrates one example of a method of filtering incoming packets in accordance with the present invention. The method of the present example can be implemented in hardware, or software, or a combination of both hardware and software.

An incoming packet can be masked through each mask entry in the mask table 10. Each mask entry can be pre-programmed to establish any condition to be matched with the masked incoming packet. Thus, the incoming packet can be masked through each and every pre-programmed mask entry in the mask table 10 to determine if there is a match or no-match of the conditions pre-programmed in the mask entries.

Further shown in FIG. 2, a match bit map 20 can be established and/or generated in the storage or memory unit, as a result of masking and matching the incoming packets in each of the mask entry. The match bit map 20 can have a bit length equal to the number of mask entries in the mask table 10. A match in any one of the pre-programmed mask entries therein can set the corresponding bit position of the match bit map 20 with a first conditional flag, such as a bit 1. On the other hand, a no-match in any one of the mask entries therein can set the corresponding bit position of the match bit map 20 with a second conditional flag, such as a bit 0. Therefore, each bit position can result in having either a 1 or 0 depending on whether there is a match or no-match in the corresponding mask entry, respectively. As such, the match bit map 20 in the storage or memory unit can either be a bit map of 1's and/or 0's, wherein each bit position corresponds to a respective mask entry indicating whether there is a match or no-match in the respective mask.

In the alternative, the match bit map 20 can have a bit length that is less than the number of mask entries in the mask table 10. For instance, the match bit map 20 can be compressed to a bit length that is less than number of mask entries by implementing an operation, such as an AND, OR, or XOR operation of the multiple mask entries to achieve a single bit length bit map. For example, a sixteen mask entry mask table can have a final match bit map of 8 bits in length by implementing an AND operation of two adjacent mask entries' match bit maps.

FIG. 2 also shows the method wherein the match bit map 20 can be applied and indexed into a conditional expression table 30. As mentioned above, the conditional expression table 30 can include a plurality of pre-programmed conditional expression entries, a no-match default expression entry or even a plurality of no-match default expression entries, and a plurality of actions, therein. Also noted above, the conditional expression table 30 can also be configured without having any no-match default expression entries. In an example where the conditional expression table 30 does not contain any no-match default expression entries, the present invention can provide one or more fixed pre-programmable default no-match action(s) within the filtering logic of the filter device to implement on a packet. In the alternative, the present invention can provide no default no-match action what so ever if there is a no-match condition within the filter device.

Since each conditional expression can be, for example a string of 0's and/or 1's with a bit length equal to the bit length of the match bit map 20, the match bit map 20 can be applied and indexed into the conditional expression table 30 to determine if there is a match or no-match between the match bit map 20 and any one of the pre-programmed conditional expressions. Therefore, upon establishing and/or generating a match bit map 20 based on masking the incoming packet in the mask table 10, the generated match bit map 20 can be applied and indexed into the conditional expression table 30. In other words, the generated match bit map 20 can be compared with each conditional expression entry to determine if there is a match or no-match from the comparison.

If it is determined that there is a match upon applying and indexing of the match bit map 20 into the conditional expression table 30, then at least one action corresponding to the matching conditional expression entry can be executed and/or implemented on the incoming packet. However, if it is determined that there is no-match upon applying and indexing of the match bit map 20 into the conditional expression table 30, then the no-match default expression along with at least one respective default action can be identified or and established within the conditional expression table 30 if therein, whereby the respective default action(s) can be subsequently implemented on the incoming packet. If however the no-match default expression along with at least one respective default action are not programmed within the conditional expression table 30, then one example of the present invention can implement one or more fixed pre-programmable default no-match action(s) within the filtering logic of the filter device on a packet. In the alternative, the present invention can implement no default no-match action what so ever if there is a no-match condition within the filter device.

Figure 3:
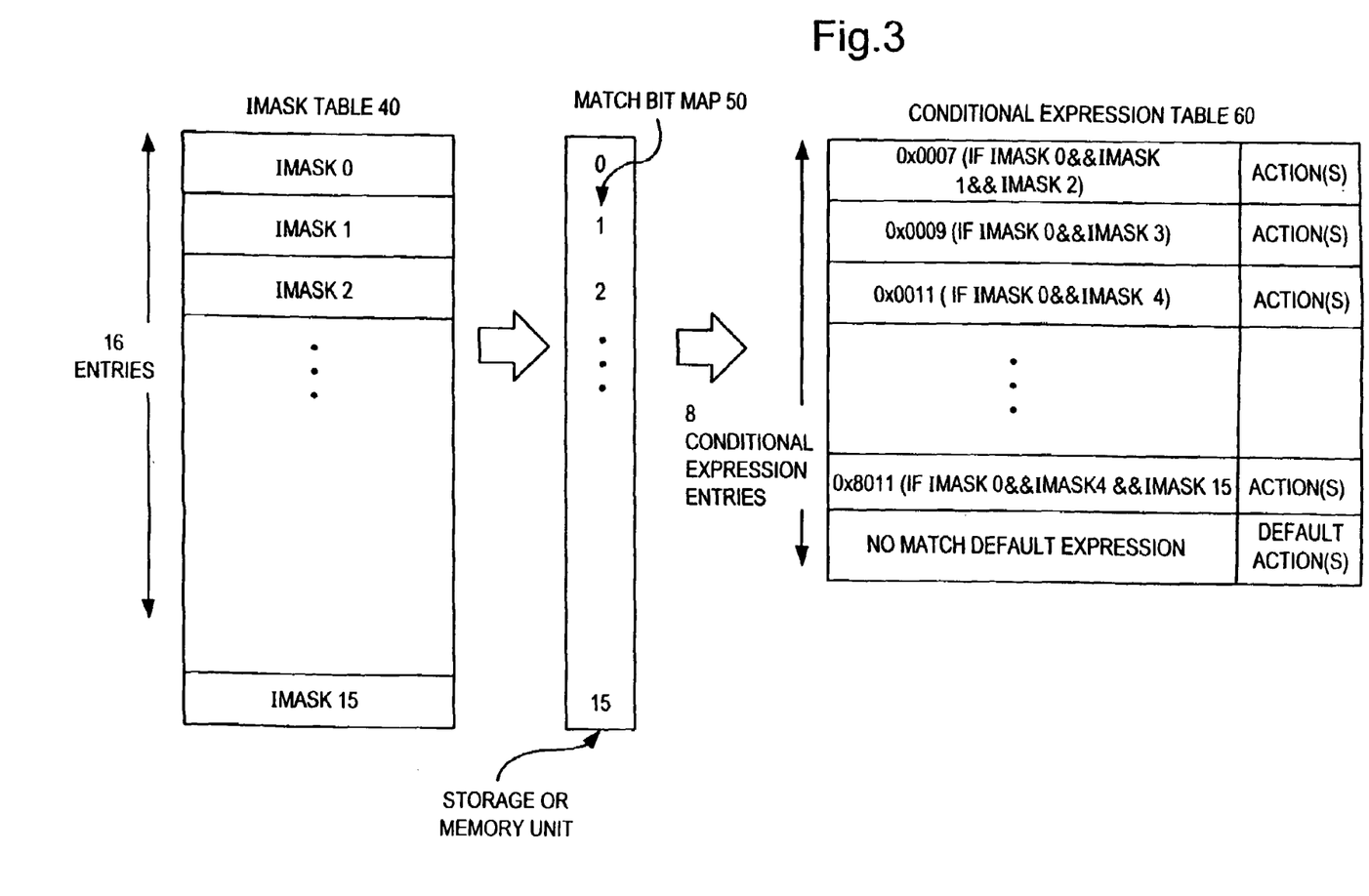
FIG. 3 illustrates another example of the present invention.

FIG. 3 illustrates another example of the present invention and is not provided to limit the scope and nature thereof in any manner or way. FIG. 3 is a hardware configuration of the invention and can be in an integrated, modular, and single chip solution and can be embodied on a semiconductor substrate, such as silicon.

FIG. 3 shows an IMASK table 40, storage or memory unit configured to store a match bit map 50, and a conditional expression table 60. The IMASK table 40 has 16 IMASK entries ranging from IMASK 0 to IMASK 15. Each IMASK entry is pre-programmed with one or more filtering and masking condition(s). Given the parameters provided in the IMASK table 40, the match bit map 50 stored in the storage or memory unit is therefore a 16-bit length map.

The conditional expression table 60 as shown in FIG. 3, has eight (8) pre-programmed conditional expression entries with corresponding action entries. Since the number of conditional expression entries in the conditional expression table 60 has no dependent relationship with the number of IMASK entries in the IMASK table 40, eight (8) conditional expression entries are pre-programmed in the conditional expression table 60 with at least one action corresponding to each conditional expression entry.

Furthermore, the conditional expression table 60 includes a pre-programmed no-match default expression entry. The no-match default expression entry as shown in FIG. 3 indicates a no-match default expression along with a plurality of pre-programmed default actions to be taken or implemented on the incoming packet if it is determined that there is a no-match between the match bit map 50 and any one of the conditional expressions in the conditional expression table 60.

Therefore, in this example, one method of filtering an incoming packet is based on the following conditions:
If (x && y && Z, then {do action(s)};
Else if (x && v), then {do action(s)};
Else if (x && w), then {do action(s)};
Else {no-match default actions}.

x, y, v, w and z represent different packet conditions as follows:
Condition x=packet with source MAC address of 20.46.72.00.00.88;
Condition y=Ipv4 packet with IGMP payload;
Condition z=IGMP type is DVMRP;
Condition v=UDP payload and UDP port no. 0x4000; and
Condition w=TCP payload and TCP port no. 0x8080.

Additionally, IMASK 0 is pre-programmed with condition x, IMASK 1 is pre-programmed with condition y, IMASK 2 is pre-programmed with condition z, IMASK 3 is pre-programmed with condition v, and IMASK 4 is pre-programmed with condition w. It is noted that although in this example, each IMASK is pre-programmed with only one condition, each IMASK can be pre-programmed with a plurality of conditions therein, in accordance to the present invention.

Thus, an incoming packet is masked through each and every IMASK entry (IMASK 0-IMASK 15) in the IMASK table 40. Upon masking the incoming packet, the present example establishes which IMASK entry has an exact match of the filtering condition(s) with respect to the incoming packet. (The IMASK entries can be pre-programmed to perform partial-bit match). It is determined, in this example, that a full or exact match of the incoming packet is identified or and established to be in IMASK 0, IMASK 1 and IMASK 2. Therefore, the match bit map 50 is established and generated as follows:
Match bit map=0000000000000111=0x0007.

This match bit map of 0x0007 is thereafter applied and indexed into the conditional expression table 60. The present example determines that a match exists in the first conditional expression entry which also has the conditional expression of 0x0007 (if IMASK 0 && IMASK 1 && IMASK 2). Since a match was determined to exist in the first conditional expression entry upon indexing the match bit map 50, the corresponding action(s) is implemented on the incoming packet.

Suppose in the example shown in FIG. 3 that the first conditional expression is configured to be 0x0006 rather than 0x0007. Following the same parameters provided in the example shown in FIG. 3, the match bit map of 0x0007 is applied and indexed to the conditional expression table 60, whereby it is determined that there is a no-match for match bit map of 0x0007 in any of the conditional expression entries. As such, the no-match default expression is identified or established and the corresponding default action(s) is implemented on the incoming packet.

In accordance with the present invention, the method of and apparatus for filtering a packet can implement action(s) on the incoming packet in a number of ways.

Figure 4:
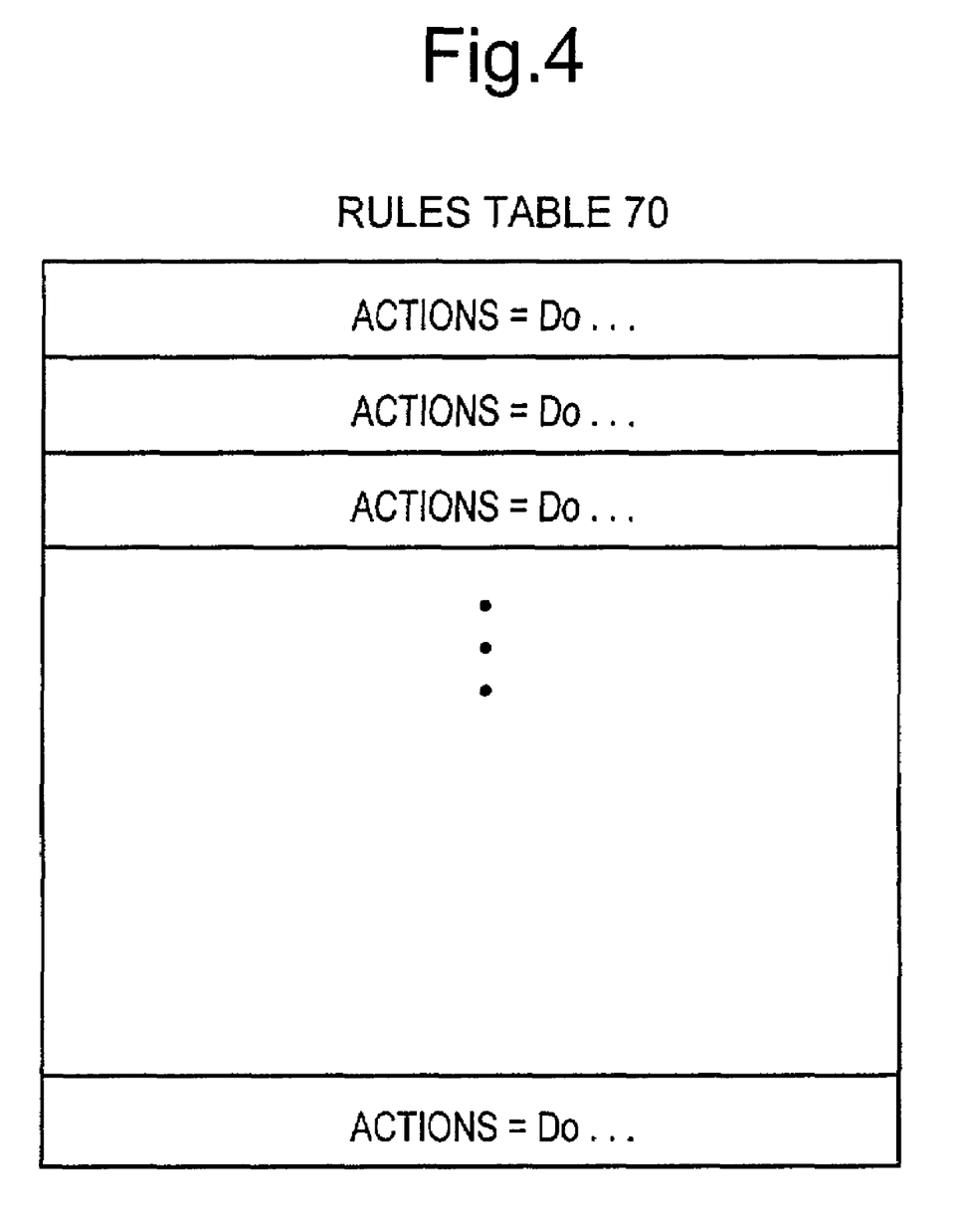
FIG. 4 illustrates one example of a rules table.

FIG. 4 illustrates one example of a rules table 70 that can be configured to store a plurality of rule values and a plurality of actions (including default action(s)) for implementing an incoming packet. Each rule values can correspond to at least one action. The rules table 70 of FIG. 4 is an example of a hardware configuration that can be embodied on a semiconductor substrate, such as silicon. As illustrated in FIG. 1, the conditional expression table 30 can include a plurality of conditional expression entries, a no-match default expression entry along with a plurality of corresponding action(s) (including default action(s)). Rather than storing the plurality of corresponding actions in the conditional expression table 30, the rules table 70 as shown in FIG. 4 can be accessed to perform or implement at least one action on the incoming packet, wherein one or more of the action(s) is stored in the rules table 70.

In one example, the rules table 70 can be identified and accessed to implement a plurality of pre-programmed actions stored therein when there is a match between the match bit map and any one of the conditional expression entry. In other words, an incoming packet can be masked through each mask entry in the mask table 10 of FIG. 1. Each mask entry can be pre-programmed to establish any condition to be matched with the masked incoming packet. Thus, the incoming packet can be masked through each and every pre-programmed mask entry in the mask table 10 to determine if there is a match or no-match of the conditions pre-programmed in the mask entries.

Thereafter, a match bit map 20 as shown in FIG. 1 can be established and/or generated in the storage or memory unit, as a result of masking and matching the incoming packets in each of the mask entry. The match bit map 20 in the storage or memory unit can either be a bit map of 1's and/or 0's, wherein each bit position corresponds to a respective mask entry indicating whether there is a match or no-match in the respective mask.

Figure 6:
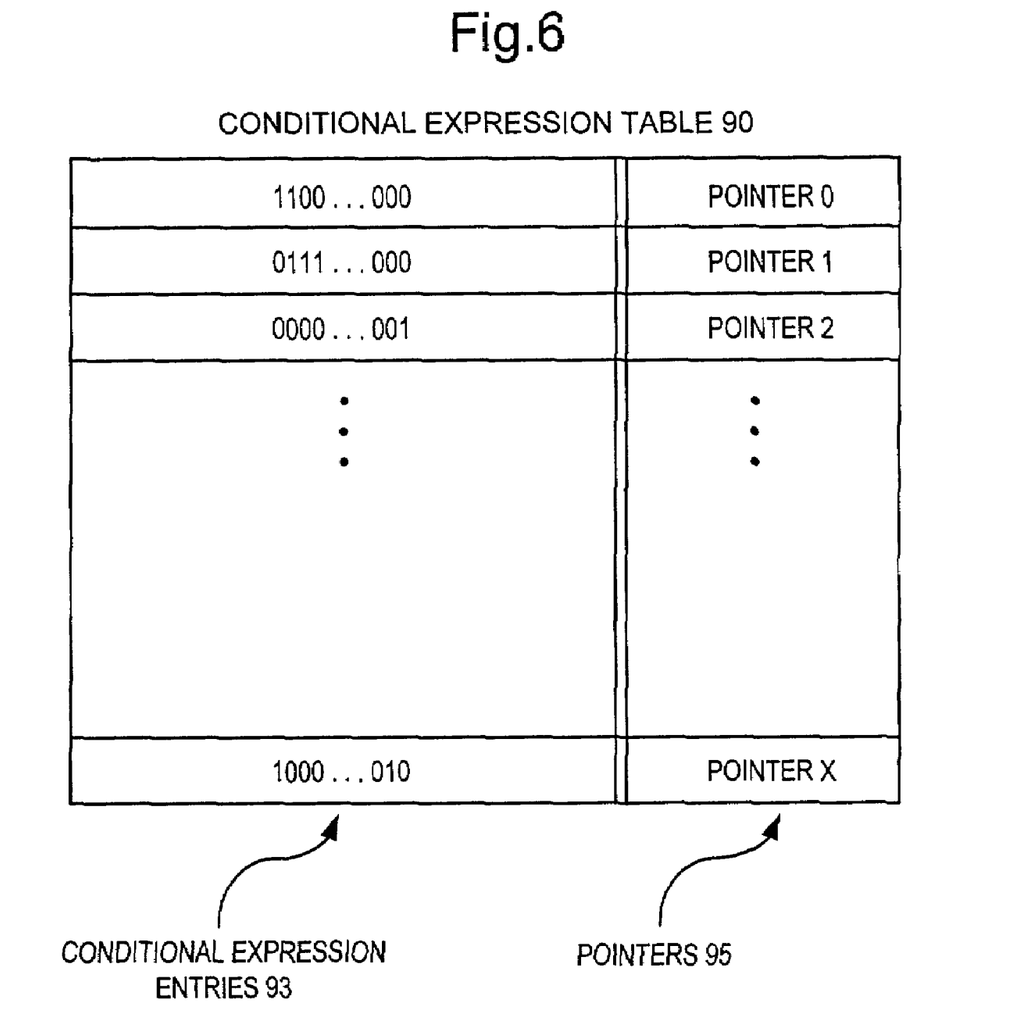
FIG. 6 illustrates one example of a conditional expression table that can include pointers therein.

The match bit map 20 can be applied and indexed into a conditional expression table 30. As mentioned above, the conditional expression table 30 can include a plurality of pre-programmed conditional expression entries. Furthermore, the conditional expression table 30 can include a plurality of rules pointers 95 as shown in FIG. 6. In other words, rather than having a plurality of action fields within the conditional expression table 30, the actions are specified in the rules table 70, and the rules pointers 95 within the conditional expression table 30 points to the desired rule entry within the rules table 70.

Therefore, in one example of incorporating the rules table 70, the match bit map can be identified or established and indexed into the conditional expression table. Upon applying and indexing the match bit map to the conditional expression table, if it is determined that there is a match between the match bit map and any one of the conditional expression entries in the conditional expression table, then the corresponding rules pointer 95 can be identified. The rules pointer 95 then points to a corresponding rules table entry wherein at least one corresponding action can be identified or established in the rules table 70. Thereafter, the identified or established action(s) in the rules table 70 can be executed and/or implemented on the incoming packet.

In another example, the rules table 70 can be identified and accessed to implement at least one pre-programmed default action stored therein when there is a no-match between the match bit map and any one of the corresponding expression entries. In other words, rather than storing the default actions in the conditional expression table 30, the default actions can be stored in the rules table 70. Therefore, in another example of incorporating the rules table 70, the match bit map can be generated and applied and indexed into the conditional expression table. If it is determined that there is a no-match between the match bit map and any one of the conditional expression entries in the conditional expression table, then the corresponding rules pointer 95 with respect to no-match default expression can be identified. The rules pointer 95 then points to a corresponding rules table entry wherein at least one corresponding action can be identified or established in the rules table 70.

In another example, the present invention can identify and access the rules table 70 by having at least one default action bit within the default action field of the conditional expression table 30. The default action bit can specify an action to fetch the rules table 70, and specify the default action(s) to be implemented. Thereafter, the established default action(s) in the rules table 70 can be executed and/or implemented on the incoming packet.

As mentioned above, the rules table 70 of FIG. 4 can include a plurality of actions, which may include the corresponding conditional expression actions and/or default actions. The rules table 70 of the present invention, can therefore be accessed solely for implementing the conditional expression actions, or solely for implementing the default actions, or a combination of both. Additionally, the method of filtering a packet using the rules table 70 can be implemented in hardware, or software, or a combination of both hardware and software.

Figure 5:
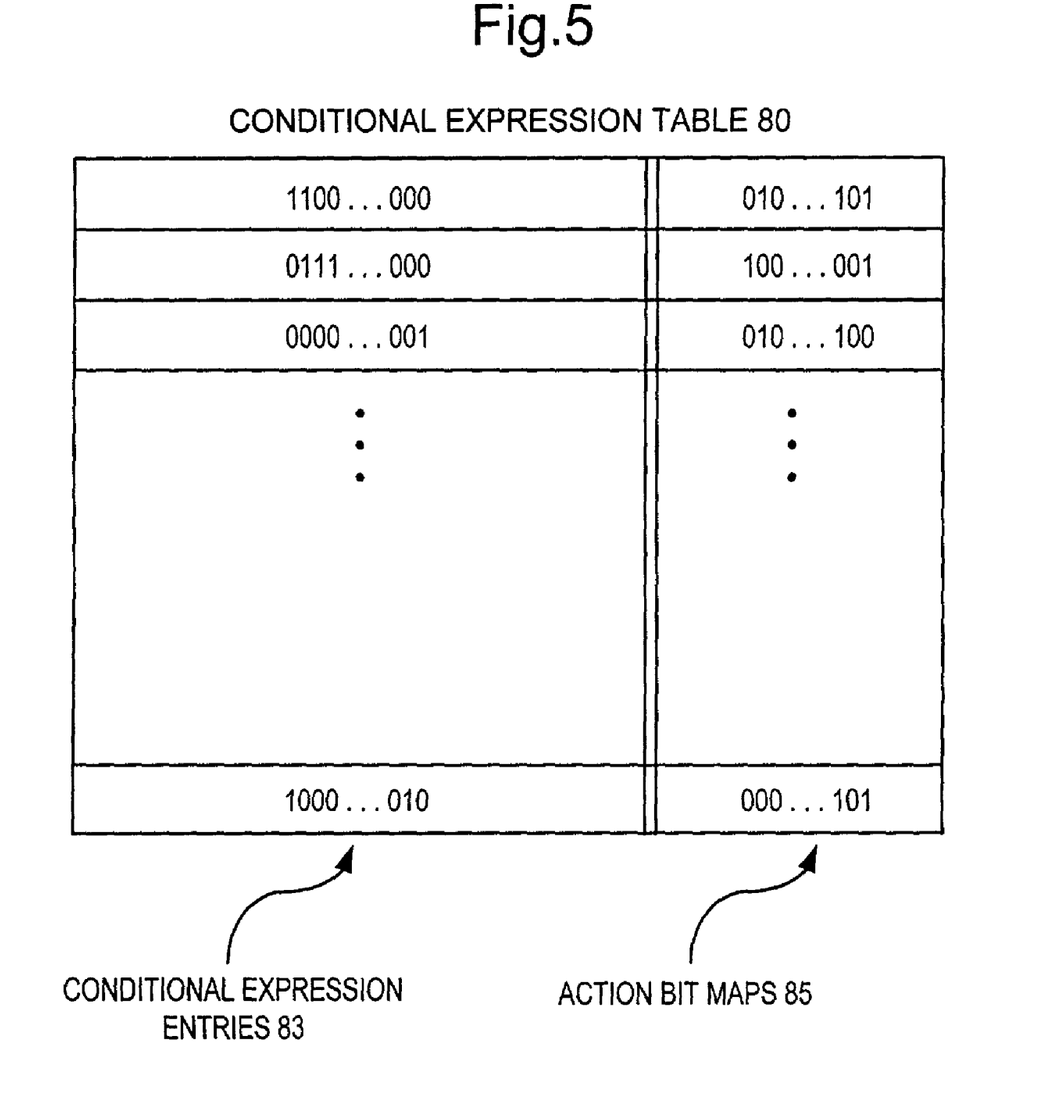
FIG. 5 illustrates one example of a conditional expression table that can include action bit maps therein.

FIG. 5 illustrates another embodiment of the present invention. FIG. 5 shows a hardware configuration of a conditional expression table 80 which can be configured to include a plurality of conditional expression entries 83 and a plurality of action bit maps 85 therein, wherein the action bit maps 85 can identify or map to one or more desired action(s). The conditional expression entries 83 can be implemented in a semiconductor substrate and can include a pre-programmed default expression as well as other pre-programmed conditional expressions therein.

Each action bit map 85 can be any bit length. Each bit within the action bit map 85 can represent a predetermined action to be implemented upon the incoming packet. For example, bit position zero of an action bit map 85 can specify whether a packet can be sent to the CPU. Therefore, when bit position zero of the action bit map 85 is set to a binary value of "1", then the packet can be sent to the CPU. In the alternative, when the bit position zero of the action bit map 85 is set to a binary value of "0", then the packet is not sent to the CPU. Similarly, bit position one of an action bit map 85 can specify whether a packet can be dropped. As such, when bit position one of the action bit map 85 is set to a binary value of "1", then the packet can be dropped; and when bit position one is set to a binary value of "0", then do not drop the packet. Moreover, bit position two of an action bit map 85 can specify whether a packet can be set to a higher COSQ priority within a network device. When bit position two of the action bit map 85 is set to a binary value of "1", then the packet can be set to a higher COSQ priority within the network device, otherwise, the packet's original COSQ priority can remain the same. It is noted that the specified actions corresponding to the bit positions of the action bit map 85 can contradict each other thereby providing a "clash" of contradicting actions. However, the present invention can provide a system of organizing the actions with respect to their precedence, wherein certain action(s) can take precedence over other action(s) during a conflict. For instance, when bit position zero and bit position one are both set to "1", then the action corresponding to bit position one can be preprogrammed to override or take precedence over the action corresponding to bit position zero, and therefore the packet is dropped over the packet being sent to the CPU as per the above example.

In another embodiment, FIG. 5 shows a hardware configuration of a conditional expression table 80 which can be configured to include a plurality of conditional expression entries 83 and a plurality of action bit maps 85 therein, wherein each action bit map 85 can represent an action execution op-code. For example, the action bit map 85 can be a "y" bit length map, wherein "y" can represent any value. Accordingly, each action bit map 85 can have $2^y$ possibilities of op-codes, and therefore can provide maximum flexibility with respect to implementing action(s) on the incoming packet.

For instance, a match bit map 20 can be generated and subsequently applied or indexed into the conditional expression table 80. The match bit map 20 can be compared to each and every conditional expression entry stored in the conditional expression table 80 to determine if there is a match or no-match. If there is a match between the match bit map 20 and any one of the conditional expression entries 83, then a corresponding action bit map 85 can be established or identified. Thereafter, the established or identified action bit map 85 can specify or identify one action or a multiple desired actions on the incoming packet. It is noted that the method of filtering a packet using the action bit map 85 can be implemented in hardware, or software, or a combination of both hardware and software.

FIG. 6 illustrates another embodiment of the present invention. FIG. 6 shows a hardware configuration of a conditional expression table 90 which can be configured to include a plurality of conditional expression entries 93 and a plurality of pointers 95. The conditional expression table 90 can be embodied on a semiconductor substrate, such as silicon. The conditional expression entries 93 can include a pre-programmed default expression as well as other pre-programmed conditional expressions therein. The pointers 95 can be address pointers that can identify or point to at least one action (can be more than one action) in an action table.

Figure 7:
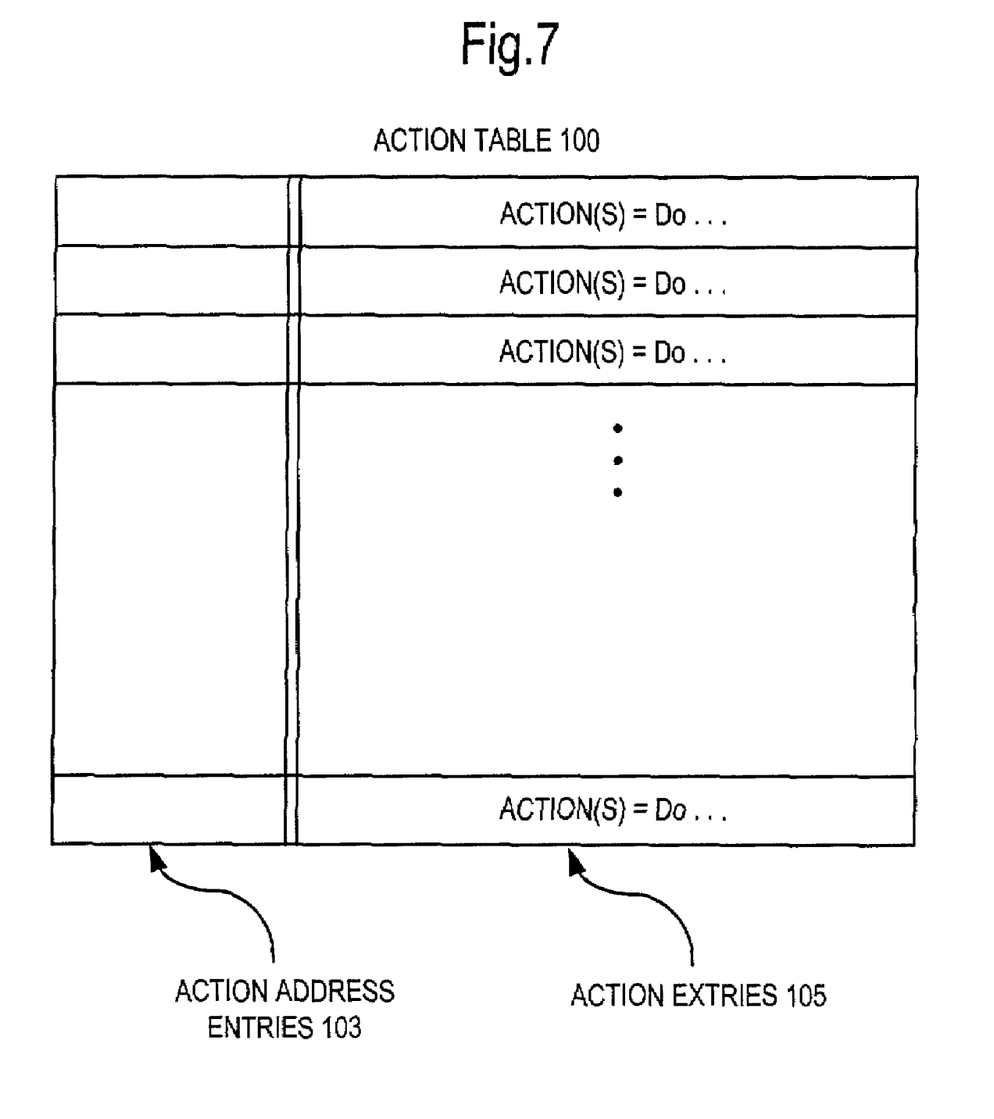
FIG. 7 illustrates one example of an action table.

FIG. 7 illustrates a hardware configuration of an action table 100 in accordance to another embodiment of the present invention. The action table 100 can be configured to store a plurality of actions, including default action(s), for implementing an incoming packet. The action table 100 can be implemented in an integrated, modular, and single chip solution. In other words, rather than storing the pre-programmed actions in the conditional expression table, FIGS. 6 and 7 provide an example of a conditional expression table 90 configured to store a plurality of pointers 95 therein, wherein the pointers 95 can point to or identify at least one desired action stored in an action table 100 for implementing an incoming packet.

For instance, a match bit map 20 can be generated, and subsequently applied or indexed into the conditional expression table 80. The match bit map 20 can be compared with each and every conditional expression entry stored in the conditional expression table 90 to determine if there is a match or no-match. If there is a match between the match bit map 20 and any one of the conditional expression entry 93, then a corresponding pointer 95 can be established or identified. Thereafter, the established pointer 95 can point to or identify at least one desired action in the action table 100 for implementing on the incoming packet. It is noted that the method of filtering a packet using pointers 95 can be implemented in hardware, or software, or a combination of both hardware and software.

As mentioned above, the action table 100 of FIG. 7 can be configured to include a plurality of actions, which may include corresponding conditional expression actions and/or default actions. The action table 100 can therefore be accessed solely for implementing the conditional expression actions, or solely for implementing the default actions, or a combination of both. Similar to other methods discussed herein, the method of filtering a packet using the action table 100 can be implemented in hardware, or software, or a combination of both hardware and software.

In addition to the method of and apparatus for filtering a packet based on an exact match or partial-bit match conditions, the present invention can also perform a sub-set match.

Figure 8:
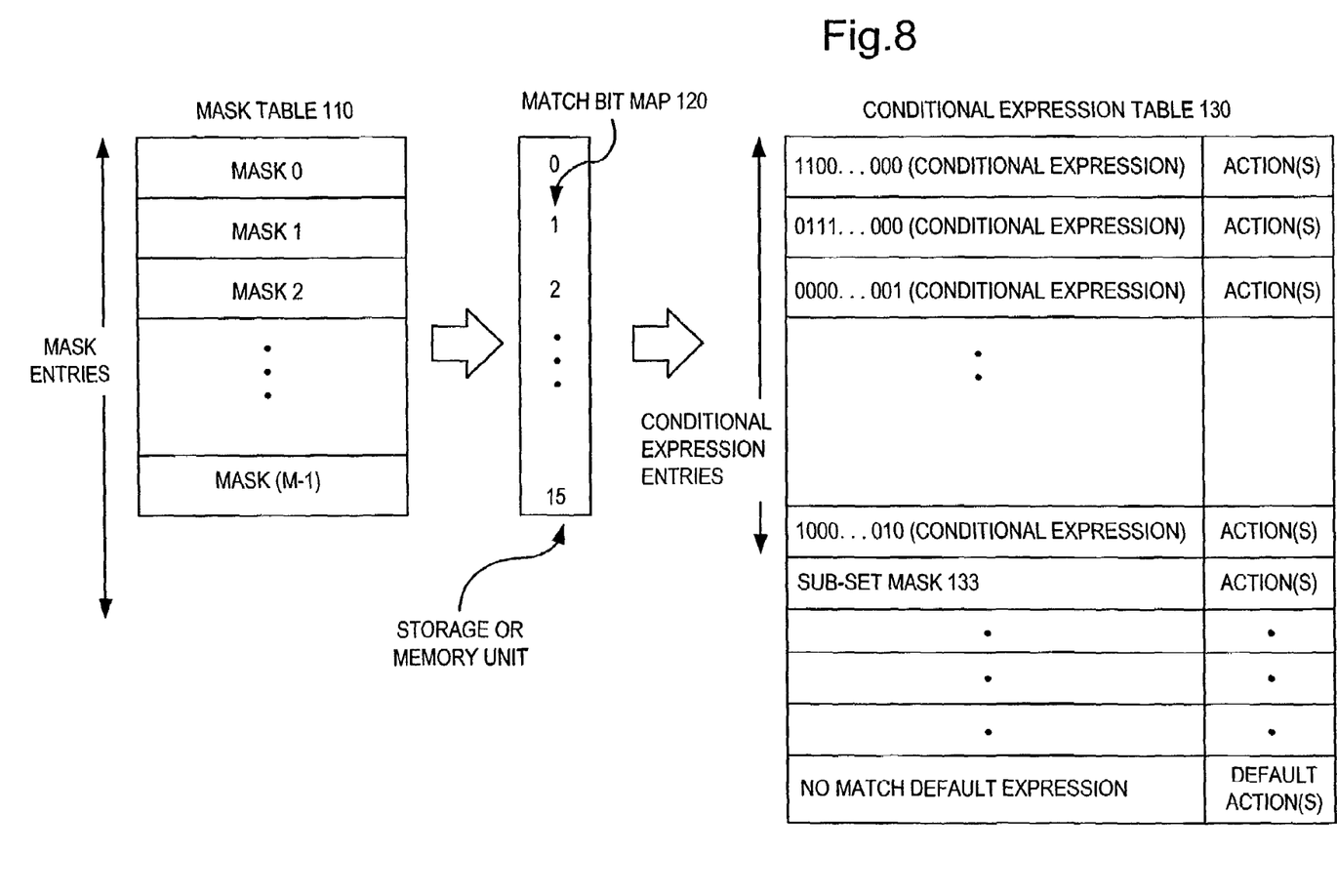
FIG. 8 illustrates one example of a configuration for filtering a packet that can include at least one sub-set mask.

FIG. 8 illustrates one example of another hardware configuration that can perform packet filtering with sub-set match functions. The configuration in FIG. 8 shows a mask table 110 and a storage or memory unit configured to store a match bit map 120 which can be similar to the mask table 10 and the match bit map 20 as discussed above with respect to FIG. 1. FIG. 8 also includes a conditional expression table 130 that can include, among other entries discussed with respect to FIG. 1, at least one sub-set mask entry 133 with corresponding sub-set actions therein. The mask table 110, the storage unit and the conditional expression table 130 having the sub-set mask entry 133 can be embodied on a semiconductor substrate, such as silicon.

It is noted that the conditional expression table 130 can also be configured without having any no-match default expression entries. In an example where the conditional expression table 130 does not contain any no-match default expression entries, the present invention can provide one or more fixed pre-programmable default no-match action(s) within the filtering logic of the filter device to implement on a packet. In the alternative, the present invention can provide no default no-match action if there is a no-match condition within the filter device.

The sub-set mask entry 133 can be configured to be a filter mask for masking the match bit map 120 based on programmable conditions. Therefore, the sub-set mask entry 133 can be pre-programmed with conditions for filtering or masking the match bit map 120.

Figure 9:
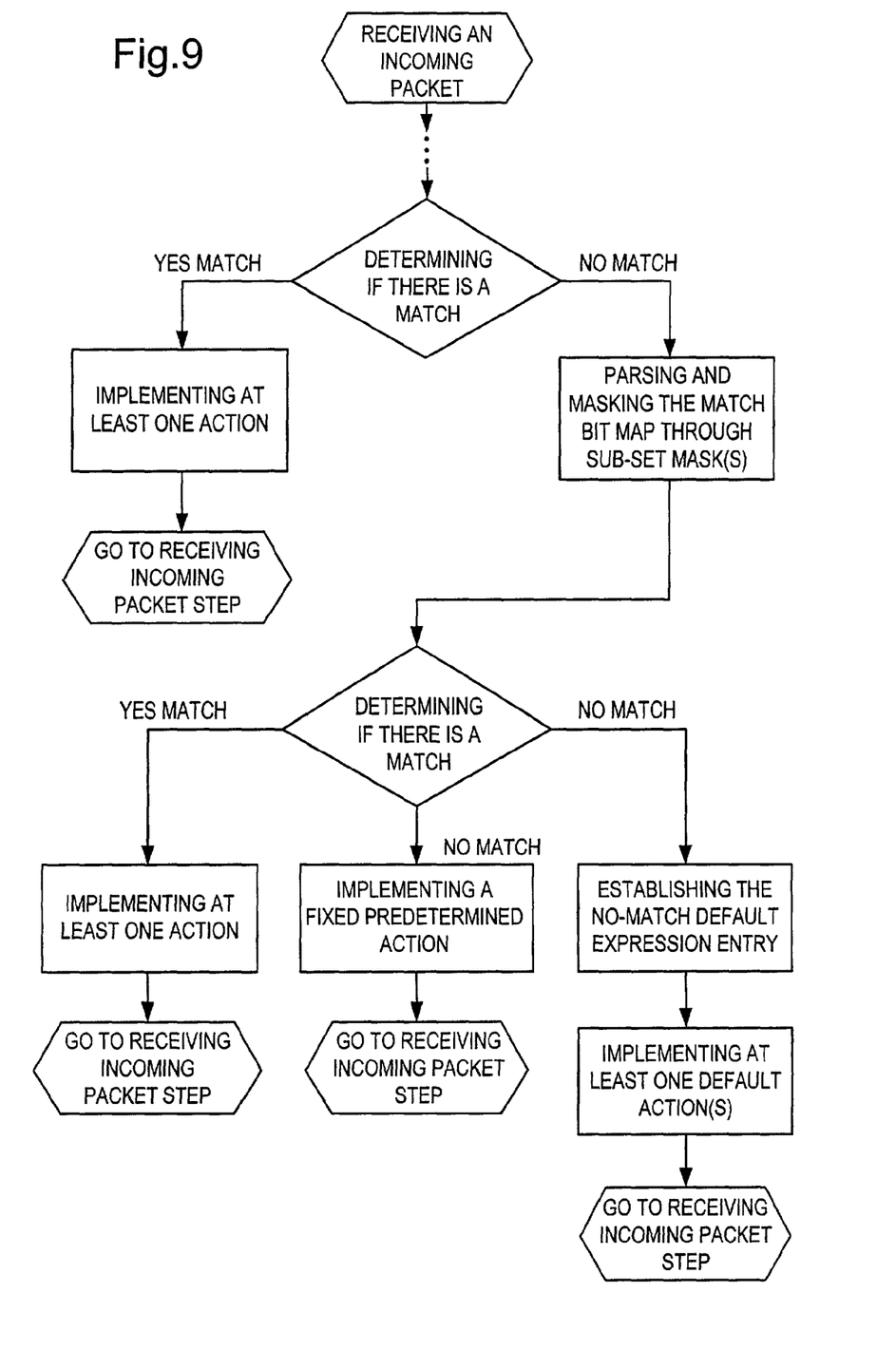
FIG. 9 illustrates a flow chart illustrating one example of a method of filtering a packet that can use at least one sub-set mask.

FIG. 9 illustrates another example of a method of filtering incoming packets in accordance with the present invention. It is noted that the method of this example can be implemented in hardware, or software, or a combination of both hardware and software. An incoming packet can be masked through the mask table 110, and a match bit map 120 can be generated as a result of masking and matching the incoming packets in each of the mask entry similar to the discussion above with respect to FIG. 2. The match bit map 120 can be applied or indexed to the conditional expression table 130. (See FIG. 2). In one example, the match bit map 120 can be indexed and compared first with the conditional expression entries 131 to determine if there is a match or no-match between the match bit map 120 and any one of the conditional expression entries 131. If it is determined that there is a match, then the present invention can implement the specified corresponding action(s) in the manners discussed above. However, if it is determined that there is no-match between the match bit map 120 and any one of the conditional expression entries 131, then the match bit map 120 can be masked through at least one of the sub-set mask 133 to further determine if there is a sub-set match or no-match of the masked match bit map in the sub-set mask 133. If it is determined that there is a match, then at least one action corresponding to the matching sub-set mask 133 can be executed and/or implemented on the incoming packet.

On the other hand, if it is determined that there is no-match of the masked match bit map in the sub-set mask 133, then the no-match default expression along with at least one action corresponding to the no-match default expression can be established or identified within the conditional expression table 130 if therein. Thereafter, at least one default action can be implemented on the incoming packet if there is no-match between the match bit map 120 and any one of the conditional expression entries in the conditional expression table entries 131, and if there is no-match of the masked match bit map in the sub-set mask 133. If however the no-match default expression along with at least one respective default action are not programmed within the conditional expression table 130, then one example of the present invention can implement one or more fixed pre-programmable default no-match action(s) within the filtering logic of the filter device on a packet. In the alternative, the present invention can implement no default no-match action what so ever if there is a no-match condition within the filter device.

Although FIG. 8 can include, among other things, the conditional expression table 130 as set forth in the figure, the present embodiment can also incorporate and integrate other embodiments of implementing conditional expression action(s) and no-match default action(s) on the incoming packets as discussed herein.

The above-disclosed configurations of the present invention can be in an integrated, modular, and single chip solution and can be embodied on a semiconductor substrate, such as silicon. Furthermore, the methods of filtering a packet as disclosed herein can be implemented in hardware, or software, or a combination of both hardware and software. Additionally, a person of skill in the art with respect to semiconductor design and manufacturing would be able to implement the various elements and methods of the present invention onto a single semiconductor substrate, based upon the architectural description discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method of processing a packet, said method comprising the steps of:
    applying the packet through a plurality of first masks;
    generating a first bit map which corresponds to the plurality of first masks, wherein each bit position of the first bit map corresponds to a respective first mask of the plurality of first masks;
    applying the first bit map to a first table comprising at least one expression and at least one corresponding action; and
    implementing at least one action on the packet.

2. The method of claim 1, wherein the generating step comprises the step of:
    generating the first bit map having a bit length that is less than a number of the plurality of first masks.

3. The method of claim 1, wherein the generating step comprises the step of:
    generating the first bit map having a bit length equal to a number of the plurality of first masks.

4. The method of claim 1, wherein the generating step comprises the step of:
    setting each bit position with a conditional flag.

5. The method of claim 4, wherein the setting step comprises the step of:
    setting each bit position of the first bit map with a first conditional flag if there is a match in the respective first mask; and
    setting each bit position of the first bit map with a second conditional flag if there is no match in the respective first mask.

6. A method of processing a packet, said method comprising the steps of:
    applying the packet through a plurality of first masks;
    generating a first bit map which corresponds to the plurality of first masks;
    applying the first bit map to a first table comprising at least one expression and at least one corresponding action; and
    implementing at least one action on the packet,
    wherein the step of applying the first bit map comprises the step of applying the first bit map to the first table having a plurality of conditional expressions therein.

7. The method of claim 6, wherein the step of applying the first bit map comprises the step of:
    applying the first bit map to the first table wherein the conditional expressions are represented by bit strings.

8. The method of claim 6, further comprising the step of:
    determining if there is a match between the first bit map and any one of the plurality of conditional expressions.

9. The method of claim 8, wherein the step of implementing at least one action comprises:
    implementing the action wherein the action is at least one specified action associated with a respective conditional expression if there is a match.

10. The method of claim 9, wherein the step implementing the action comprises:
    establishing a second bit map which is provided in the first table; and
    applying the second bit map to a second table having the at least one specified action therein.

11. The method of claim 9, wherein the step of implementing the action comprises:
    establishing a pointer which is provided in the first table; and
    applying the pointer to a second table having the at least one specified action therein.

12. The method of claim 9, wherein the step of implementing the action comprises:
    establishing a pointer which is provided in the first table; and
    applying the pointer to a third table having the at least one specified action therein.

13. The method of claim 9, wherein the step of implementing the action comprises:
    establishing at least one instruction provided in the first table; and
    implementing the at least one instruction within an execution unit.

14. The method of claim 8, further comprising the step of:
    applying the first bit map through at least one second mask if there is no match between the first bit map and any one of the plurality of conditional expressions.

15. The method of claim 14, wherein the step of implementing at least one action comprises:
    implementing the action wherein the action is at least one sub-set action if there is a match in the at least one second mask.

16. The method of claim 14, wherein the step of implementing at least one action comprises:
    implementing the action wherein the action is at least one default action if there is no match in the at least one second mask.

17. The method of claim 16, wherein the step of implementing the action comprises:
    establishing the at least one default action which is provided in the first table.

18. The method of claim 16, wherein the step of implementing the action comprises:
    establishing the at least one default action which is provided in a second table.

19. The method of claim 16, wherein the step of implementing the action comprises:
    establishing the at least one default action, wherein the at least one default action comprises of a fixed predetermined action.

20. The method of claim 8, wherein the step of implementing at least one action comprises:
implementing the action wherein the action is at least one default action if there is no match between the first bit map and any one of the conditional expressions.

21. The method of claim 20, wherein the step of implementing the action comprises:
establishing the at least one default action which is provided in the first table.

22. The method of claim 20, wherein the step of implementing the action comprises:
establishing the at least one default action which is provided in a second table.

23. The method of claim 20, wherein the step of implementing the action comprises:
establishing the at least one default action, wherein the at least one default action comprises of a fixed predetermined action.

24. A filter for processing a packet, said filter comprising:
a plurality of first masks for masking the packet;
a storage unit configured to correspond to the plurality of first masks, the storage unit for storing a first bit map, wherein the storage unit is configured to store the first bit map such that each bit position of the first bit map corresponds to a respective first make of the plurality of first masks; and
a first table configured to have the first bit map applied thereto, wherein the first table comprises at least one expression and at least one corresponding action.

25. The filter of claim 24, wherein the storage unit is configured to store the first bit map wherein the first bit map has a bit length that is less than a number of the plurality of first masks.

26. The filter of claim 24, wherein the storage unit is configured to store the first bit map wherein the first bit map has a bit length equal to a number of the plurality of first masks.

27. The filter of claim 24, wherein the storage unit is configured to store the first bit map such that each bit position of the first bit map is set with a conditional flag.

28. The filter of claim 27, wherein storage unit is configured to store the first bit map such that each bit position of the first bit map is set with a first conditional flag if there is a match in the respective first mask, and wherein each bit position of the first bit map is set with a second conditional flag if there is no match in the respective first mask.

29. A filter for processing a packet, said filter comprising:
a plurality of first masks for masking the packet;
a storage unit configured to correspond to the plurality of first masks, the storage unit for storing a first bit map; and
a first table configured to have the first bit map applied thereto, wherein the first table comprises at least one expression and at least one corresponding action, wherein the first table includes a plurality of conditional expressions configured for indexing the first bit map.

30. The filter of claim 29, wherein the first table includes the plurality of the conditional expressions that are bit strings.

31. The filter of claim 30, further comprising:
a second table configured to have a plurality of first actions specified therein.

32. The filter of claim 31, wherein the first table further includes:
a plurality of second bit maps configured to correspond to the plurality of conditional expressions, respectively, and wherein at least one of the plurality of second bit maps specifies at least one of the plurality of first actions in the second table if the first bit map matches at least one of the plurality of conditional expressions.

33. The filter of claim 31, wherein the first table further includes:
a plurality of pointers configured to correspond to the plurality of conditional expressions, respectively, and wherein at least one of the plurality of pointers points to at least one of the plurality of first actions in the second table if the first bit map matches at least one of the plurality of conditional expressions.

34. The filter of claim 31, wherein the second table further includes:
at least one second action specified therein, and wherein the at least one second action is implemented if there is no match between the first bit map and at least one of the plurality of conditional expressions.

35. The filter of claim 29, further comprising:
a third table configured to have a plurality of first actions specified therein.

36. The filter of claim 35, wherein the first table further includes:
a plurality of pointers configured to correspond to the plurality of conditional expressions, respectively, and wherein at least one of the plurality of pointers points to at least one of the plurality of first actions in the third table if the first bit map matches at least one of the plurality of conditional expressions.

37. The filter of claim 29, further comprising:
an action execution unit for implementing at least one first action on the packet.

38. The filter of claim 37, wherein the first table is configured to include a plurality of operational instructions, the plurality of operational instructions correspond to the plurality of conditional expressions, respectively, and wherein at least one of the plurality of operational instructions instructs the action execution unit to implement the at least one action if the first bit map matches at least one of the plurality of conditional expressions.

39. The filter of claim 29, wherein the first table is configured to include a default expression entry, and at least one second action corresponding to the default expression entry, wherein the at least one second action is implemented if there is no match between the first bit map and at least one of the plurality of conditional expressions.

40. The filter of claim 29, wherein the first table further includes:
at least one second mask for masking the first bit map; and
wherein the first table is configured to include at least one third action, the at least one third action corresponds to the at least one second mask, wherein the third action is implemented if there is no match between the first bit map and at least one of the plurality of conditional expressions and if there is a match in the at least one second mask.

41. The filter of claim 40, wherein the first table is configured to include a default expression entry, and at least one second action corresponding to the default expression entry, wherein the at least one second action is implemented if there is no match between the first bit map and at least one of the plurality of conditional expressions, and there is no match in the at least one second mask.

42. The filter of claim 40, further comprising:
a second table having at least one second action specified therein, and wherein the at least one second action is implemented if there is no match between the first bit map and at least one of the plurality of conditional expressions, and if there is no match in the at least one second mask.

43. The filter of claim 29, wherein a fixed predetermined action is implemented if there is no match between the first bit map and at least one of the plurality of conditional expressions.

44. The filter of claim 29, wherein the first table further includes:
at least one second mask for masking the first bit map; and
wherein a fixed predetermined action is implemented if there is no match between the first bit map and at least one of the plurality of conditional expressions, and if there is no match in the at least one second mask.

45. A system for filtering a packet, said system comprising:
a plurality of first masking means for masking the packet;
generating means for generating a first bit map to correspond to the plurality of first masking means, wherein each bit position of the first bit map corresponds to a respective first masking means of the plurality of first masking means;
means for applying the first bit map to a first table comprising at least one expression and at least one corresponding action; and
implementing means for implementing the at least one action stored in the first table.

46. The system of claim 45, wherein the generating means generates the first bit map having a bit length that is less than a number of the plurality of first masking means.

47. The system of claim 45, wherein the generating means generates the first bit map having a bit length equal to a number of the plurality of first masking means.

48. The system of claim 47, further comprises:
a means for setting each bit position of the first bit map with a conditional flag.

49. The system of claim 48, wherein the means for setting further sets each bit position of the first bit map with a first conditional flag if there is a match in the respective first masking means; and
sets each bit position of the first bit map with a second conditional flag if there is no match in the respective first masking means.

50. A system for filtering a packet, said system comprising:
a plurality of first masking means for masking the packet;
generating means for generating a first bit map to correspond to the plurality of first masking means;
means for applying the first bit map to a first table comprising at least one expression and at least one corresponding action; and
implementing means for implementing the at least one action stored in the first table,
wherein the means for applying the first bit map further includes indexing the first bit map to a plurality of conditional expressions.

51. The system of claim 50, wherein the means for applying the first bit map such that the plurality of conditional expressions are represented by bit strings.

52. The system of claim 50 further comprises:
a determining means for determining if there is a match between the first bit map and any one of the plurality of conditional expressions.

53. The system of claim 52, wherein the implementing means for implementing at least one action further comprises:
an implementing means for implementing the action wherein the action is at least one specified action associated with a respective conditional expression if there is a match.

54. The system of claim 53, further comprising:
a means for establishing a second bit map in the first table;
a first storage means for storing at least one specified action; and
a means for applying the action bit map to the first storage means.

55. The system of claim 53, further comprising:
a means for establishing a pointer in the first table;
a first storage means for storing at least one specified action; and
a means for applying the pointer to the first storage means.

56. The system of claim 53, further comprising:
a means for establishing a pointer in the first table;
a second storage means for storing at least one specified action; and
a means for applying the pointer to the second storage means.

57. The system of claim 53, wherein the implementing means implements an operational instruction stored in the first table.

58. The system of claim 52 further comprising:
at least one second masking means for masking the first bit map if there is no match between the first bit map and any one of the plurality of conditional expressions.

59. The system of claim 58, wherein the implementing means further implements the action wherein the action is at least one sub-set action if there is a match in the at least one second masking means.

60. The system of claim 58, wherein the implementing means further implements the action wherein the action is at least one default action if there is no match in the at least one second masking means.

61. The system of claim 60, wherein the implementing means implements the at least one default action stored in the first table.

62. The system of claim 60, wherein the implementing means implements the at least one default action stored in a first storage means for storing rules.

63. The system of claim 60, wherein the implementing means implements the at least one default action, wherein the at least one default action comprises of a fixed predetermined action.

64. The system of claim 52, wherein implementing means further implements the action wherein the action is at least one default action if there is no match between the first bit map and any one of the conditional expressions.

65. The system of claim 64, wherein the implementing means implements the at least one default action stored in the first table.

66. The system of claim 64, wherein the implementing means implements the at least one default action stored in a first storage means for storing rules.

67. The system of claim 64, wherein the implementing means implements the at least one default action, wherein the at least one default action comprises of a fixed predetermined action.

* * * * *